(12) United States Patent
Tymus

(10) Patent No.: US 9,960,539 B2
(45) Date of Patent: May 1, 2018

(54) WALL OUTLET WITH EXTENDABLE ELECTRICAL RECEPTACLES

(71) Applicant: Roderick Tymus, Columbia, MD (US)

(72) Inventor: Roderick Tymus, Columbia, MD (US)

(*) Notice: Subject to any disclaimer, the term of this patent is extended or adjusted under 35 U.S.C. 154(b) by 0 days. days.

(21) Appl. No.: 15/462,090

(22) Filed: Mar. 17, 2017

(65) Prior Publication Data

US 2017/0302026 A1   Oct. 19, 2017

Related U.S. Application Data

(60) Provisional application No. 62/323,847, filed on Apr. 18, 2016.

(51) Int. Cl.
*H01R 13/639*  (2006.01)
*H01R 13/70*   (2006.01)
*H01R 13/72*   (2006.01)
*H01R 25/00*   (2006.01)

(52) U.S. Cl.
CPC ......... *H01R 13/6395* (2013.01); *H01R 13/70* (2013.01); *H01R 13/72* (2013.01); *H01R 25/006* (2013.01)

(58) Field of Classification Search
CPC ........ H01R 11/02; H01R 13/70; H01R 13/72; H01R 13/6395; H01R 25/006
USPC ..................................................... 439/501, 4
See application file for complete search history.

(56) References Cited

U.S. PATENT DOCUMENTS

| 3,566,332 | A | * | 2/1971 | Bonhomme | H02G 11/02 191/12.4 |
| 3,920,308 | A | * | 11/1975 | Murray | H02G 11/02 439/501 |
| 4,467,979 | A | * | 8/1984 | Koehler | B65H 75/40 191/12.4 |
| 5,494,446 | A | | 2/1996 | DeLucia et al. | |
| 5,562,488 | A | * | 10/1996 | Neiser | H01R 13/514 439/373 |
| 5,701,981 | A | * | 12/1997 | Marshall | H02G 11/02 191/12.4 |
| 5,723,815 | A | | 3/1998 | Pena | |
| 5,738,548 | A | | 4/1998 | Rutulante | |
| 7,309,834 | B1 | * | 12/2007 | Byrd | B65H 75/425 174/135 |

(Continued)

*Primary Examiner* — Tulsidas C Patel
*Assistant Examiner* — Travis Chambers
(74) *Attorney, Agent, or Firm* — Global Intellectual Property Agency, LLC; Daniel Enea

(57) ABSTRACT

A wall outlet with extendable electrical receptacles is provided. The wall outlet is mountable into the wall outlet cavity of an existing structure. The wall outlet includes extendable electrical receptacles that are extendable from the wall outlet via electrical cables that are wound around a spool. Each electrical cable is wound around a section of the spool, such that it may be unwound, independently, therefrom. The electrical receptacles are attached to ends of the cables and are in electrical communication therewith. A user extends an electrical receptacle from the wall outlet by pulling the electrical receptacle in a first direction, which unwinds the electrical cable from the spool. Each section of the spool is coupled to an actuator that when triggered rotates the corresponding section of the spool in a second direction, which winds the electrical cable around the spool and retracts the electrical receptacle back into the wall outlet.

6 Claims, 3 Drawing Sheets

(56) References Cited

U.S. PATENT DOCUMENTS 7,857,659 B2 * 12/2010 Wang .................. G06F 1/16
                                                        439/501
8,137,129 B2 *  3/2012 Woods ............. B60R 16/0215
                                                        439/501

* cited by examiner

WALL OUTLET WITH EXTENDABLE ELECTRICAL RECEPTACLES

CROSS REFERENCE TO RELATED APPLICATIONS

This application claims the benefit of U.S. Provisional Application No. 62/323,847 filed on Apr. 18, 2016. The above identified patent application is herein incorporated by reference in its entirety to provide continuity of disclosure.

BACKGROUND OF THE INVENTION

The present invention relates to wall outlets. More specifically, the present invention relates to a wall outlet having electrical receptacles that are capable of being extended and retracted relative to the wall outlet.

Many electronic devices require a connection with a wall outlet in order to provide electricity to the electronic device so that it may function. However, it is often that these types of electronic devices must be utilized at a distance from a wall outlet that is greater than the length of the device's power cord. Thus, in order to remedy this, individuals typically utilize extension cords to provide an additional power outlet closer to the device. However, extension cords often become tangled, which can be difficult and time consuming to untangle the cord. Moreover, extension cords left on the ground, whether or not in use, may cause tripping hazards. Therefore, there is a need in the prior art for a wall outlet having extendable and retractable electrical receptacles.

The use of wall outlets for facilitating the charging of electronic devices is known. More specifically, wall receptacles heretofore devised and utilized are known to consist basically of familiar, expected and obvious structural configurations, notwithstanding the myriad of designs encompassed by the crowded prior art which have been developed for the fulfillment of countless objectives and requirements.

While these devices fulfill their respective, particular objectives and requirements, the aforementioned patents and publications do not disclose a wall outlet including a wall outlet box having one or more apertures, each aperture configured to receive an electrical receptacle therein, wherein each electrical receptacle is coupled to an electrical cable, the electrical cable configured to be in electrical communication with an electrical power source of a structure, a spool including one or more sections, each of the one or more sections configured to receive an electrical cable therearound, and an actuator coupled to each of the one or more sections of the spool, each actuator configured to rotate a corresponding one or more section of the spool, wherein rotation of the one or more sections of the spool in a first direction causes a corresponding electrical cable to wind therearound and the electrical receptacle to retract; wherein rotation of the one or more sections of the spool in a second direction causes a corresponding electrical cable to unwind therearound and the electrical receptacle to extend.

In these respects, the wall outlet according to the present invention substantially departs from the conventional concepts and designs of the prior art, and in so doing provides an apparatus primarily developed for the purpose of providing a wall outlet having electrical receptacles capable of extending and retracting from the wall outlet, thereby serving as an electrical outlet extension for user's desiring to power their electronic devices at distances greater than the lengths of their electronic devices' power cords.

SUMMARY OF THE INVENTION

In view of the foregoing disadvantages inherent in the known types of wall outlets now present in the prior art, the present invention provides a wall outlet with extendable and retractable electrical receptacles wherein the same can be utilized for providing convenience for the user when utilizing, powering, and/or charging an electronic device. The present invention comprises a wall outlet box including a face plate and side plates, the wall outlet box configured to be mounted into a wall outlet cavity of a structure; the face plate comprising one or more apertures, each configured to receive an electrical receptacle therein; each electrical receptacle coupled to an electrical cable, the electrical cable configured to be in electrical communication with an electrical power source of a structure; a spool including one or more sections, each of the one or more sections configured to receive an electrical cable therearound; an actuator coupled to each of the one or more sections of the spool, each actuator configured to rotate a corresponding one or more section of the spool; wherein rotation of the one or more sections of the spool in a first direction causes a corresponding electrical cable to wind therearound and the electrical receptacle to retract; wherein rotation of the one or more sections of the spool in a second direction causes a corresponding electrical cable to unwind therearound and the electrical receptacle to extend.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
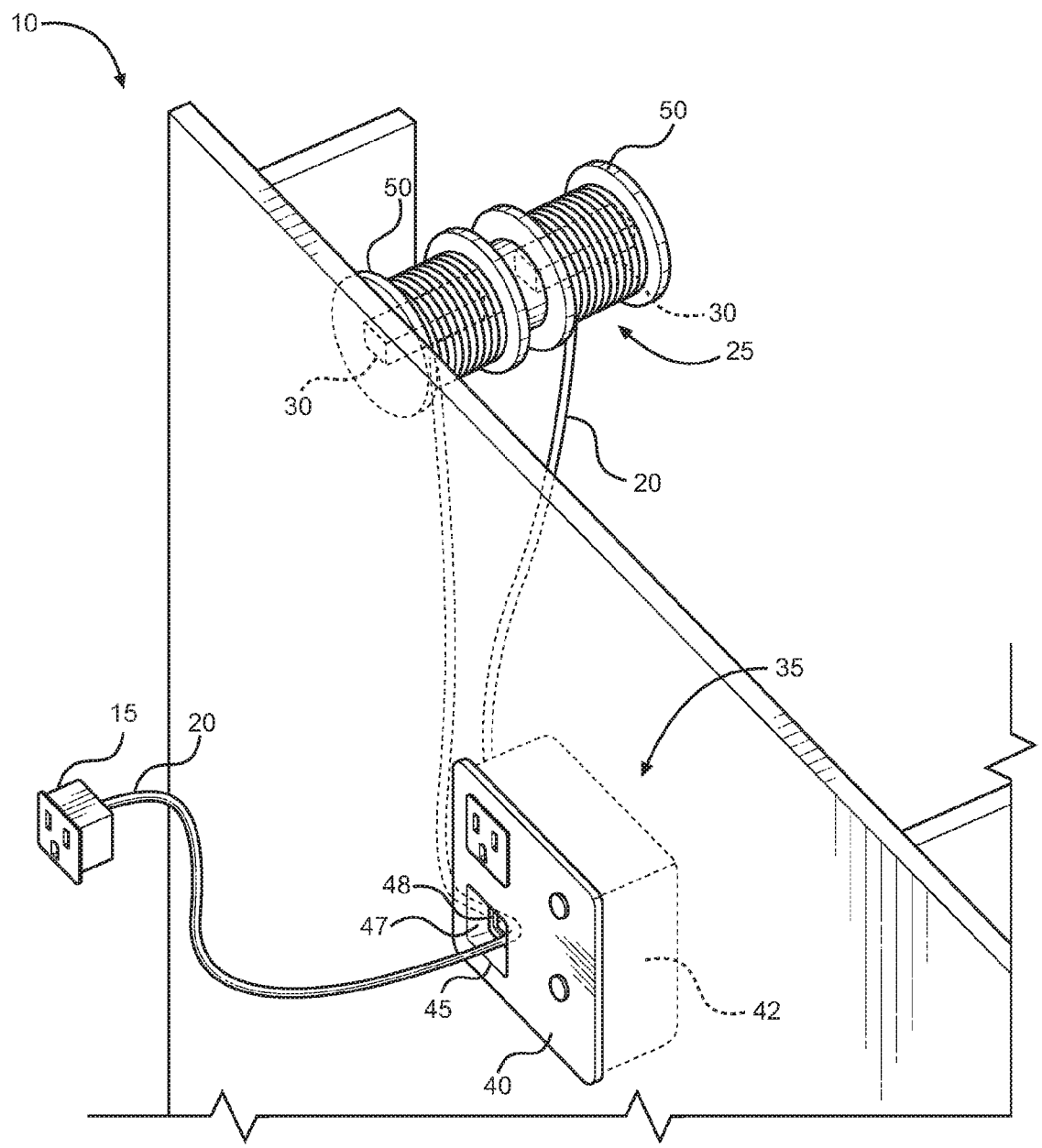
FIG. 1 shows a perspective view of the wall outlet mounted into the wall of a structure.

Reference is made herein to the attached drawings. Like reference numerals are used throughout the drawings to depict like or similar elements of the wall outlet. The figures are intended for representative purposes only and should not be considered to be limiting in any respect.

Figure 2:
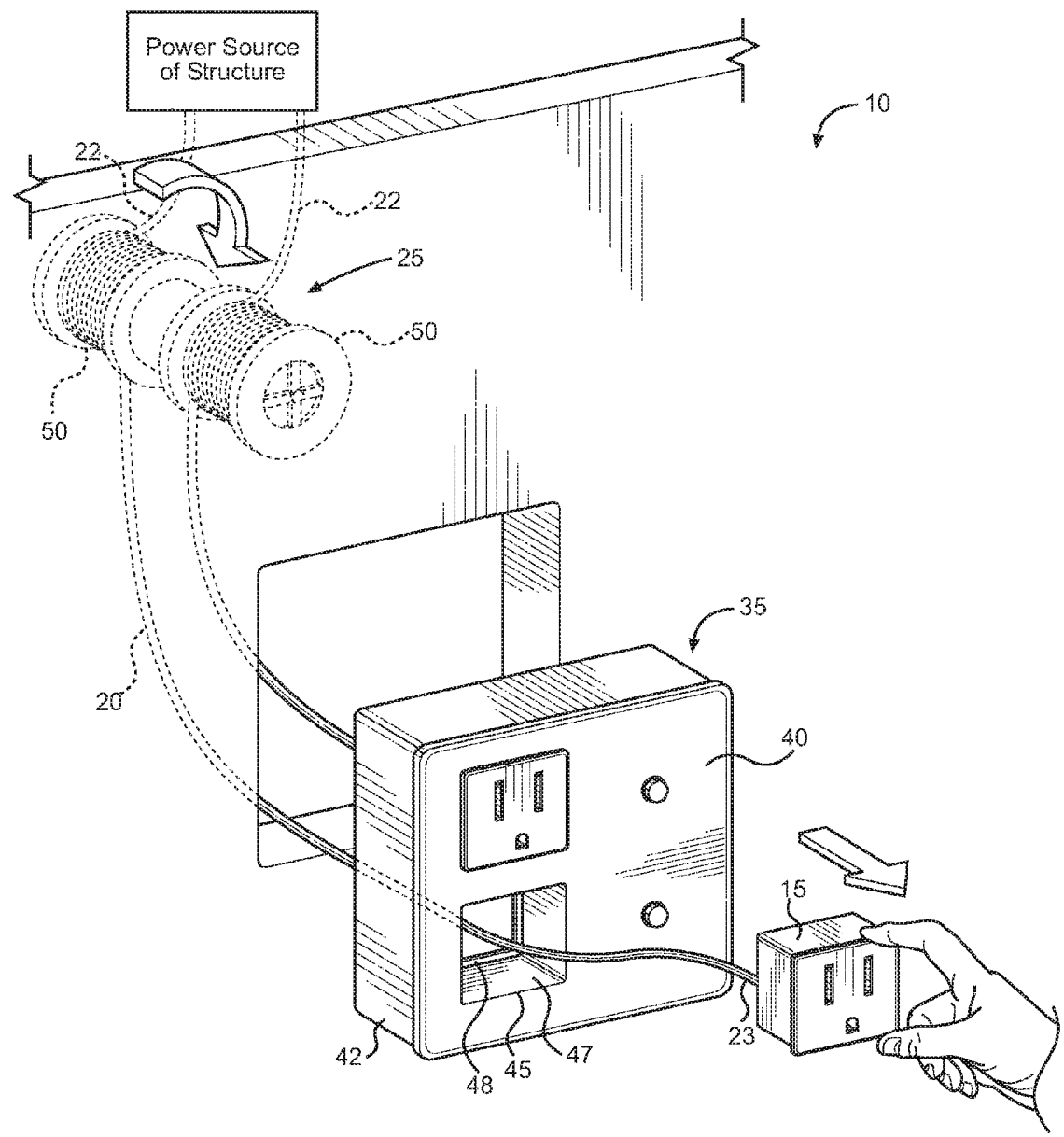
FIG. 2 shows a partial phantom and exploded view of an electrical cable being unwound and extended from the wall outlet and the wall outlet box being mounted into a wall cavity.

Referring now to FIGS. 1 and 2, there is shown a perspective view of the wall outlet mounted into the wall of a structure and a partial phantom, exploded view of an electrical cable being unwound and extended from the wall outlet and the wall outlet box being mounted into a wall outlet cavity, respectively. The present invention provides a wall outlet 10 that is retrofittable into the wall outlet cavity of an existing structure. The wall outlet 10 comprises one or more extendable electrical receptacles 15, wherein the electrical receptacles 15 are extendable from the wall outlet 10 via electrical cables 20 that are wound around a cylindrical spool 25. Each electrical cable 20 is wound around a section of the spool 25, such that it may be unwound, independently, therefrom. The electrical receptacles 15 are attached to ends of the cables 20 and are extendable from the wall outlet 10 via unwinding of the electrical cables 20 from the spool 25 in a first direction. The wall outlet 10 further comprises one or more actuators 30 corresponding to a section of the spool 25, wherein the actuator 30 is configured to rotate that section of the spool 25 in a second direction in order to retract the electrical receptacles 15 back into the wall outlet 10.

The wall outlet 10 comprises a wall outlet box 35 sized and configured to be mounted into a conventional wall outlet cavity and the adjacent wall cavity of a structure. The outlet box 35 comprises a face plate 40 having one or more side plates 42. The face plate 40 is sized and configured to be flush mounted to the wall outlet cavity of a structure. The face plate 40 includes one or more apertures 45 sized to removably receive an electrical receptacle 15 therein. In the depicted embodiment, the wall outlet box 35 comprises two apertures 45 disposed on the same longitudinal axis. However, in alternative embodiments, the number and layout of the apertures 45 on the wall outlet box 35 may vary. The apertures 45 comprise an interior wall 47 having a lip 48 disposed around a perimeter edge of the interior wall 47. The lip 48 is configured to receive a perimeter edge of a rear end of the electrical receptacle 15. The lip 48 prevents the electrical receptacles 15 from sliding through the aperture and into the wall cavity of the structure and further halts the electrical receptacles 15 within the wall outlet box 35 such that they rest flush in the apertures 45. Each of the electrical receptacles 15 comprises a housing configured to receive a connector plug having two or three connection prongs thereon. In the depicted embodiment, the electrical receptacles 15 are configured to receive three and two pronged connector plugs.

The spool 25 of the wall outlet 10 is configured to be mounted into an area of a wall cavity of a structure that is adjacent to a wall outlet cavity of the structure. The spool 25 comprises one or more rotatable sections 50, wherein each section 50 is configured to receive the electrical cable 20 wound therearound. In one embodiment, the spool 25 is rotatable in a clockwise and counterclockwise direction, wherein the clockwise rotation of the spool 25 unwinds the electrical cable 20 therefrom, and the counterclockwise rotation of the spool 25 winds the electrical cable 20 therearound. In another embodiment, the spool 25 is rotatable in a clockwise and counterclockwise direction, wherein the counterclockwise rotation of the spool 25 unwinds the electrical cable 20 therefrom, and the clockwise rotation of the spool 25 winds the electrical cable 20 therearound. Each of the rotatable sections 50 are independently rotatable via actuators 30. In the depicted embodiment, the spool 25 is mounted perpendicularly relative to the wall, however, in alternative embodiments, the spool 25 may be mounted vertically relative to the wall.

The electrical cables 20 comprises a first end 22 and a second end 23. The first ends 22 are in electrical communication with the power source of a structure, thereby providing electrical power to the cable 20. The second end 23 of the cable 20 is affixed to the electrical receptacle 15 and is in electrical communication therewith, such that it may provide power thereto and establish an electrical connection with a connector plug inserted therein. The first ends of 22 of the cables 20 are further affixed to the spool 25. The pulling of the electrical cables 20 rotates the spool 25 in a first direction, which thereby unwinds the cable 20 from the spool 25. In one embodiment, the pulling of the electrical cables 20 rotates the spool 25 in a clockwise direction, which unwinds the cable 20 from the spool 25. In another embodiment, the pulling of the electrical cables 20 rotates the spool 25 in a counterclockwise direction, which unwinds the cable 20 from the spool 25. In this way, the electrical cables 20 may be unwound and extended as desired simply by pulling the electrical receptacles 15 out of the wall outlet 10 to a desired length.

Figure 3:
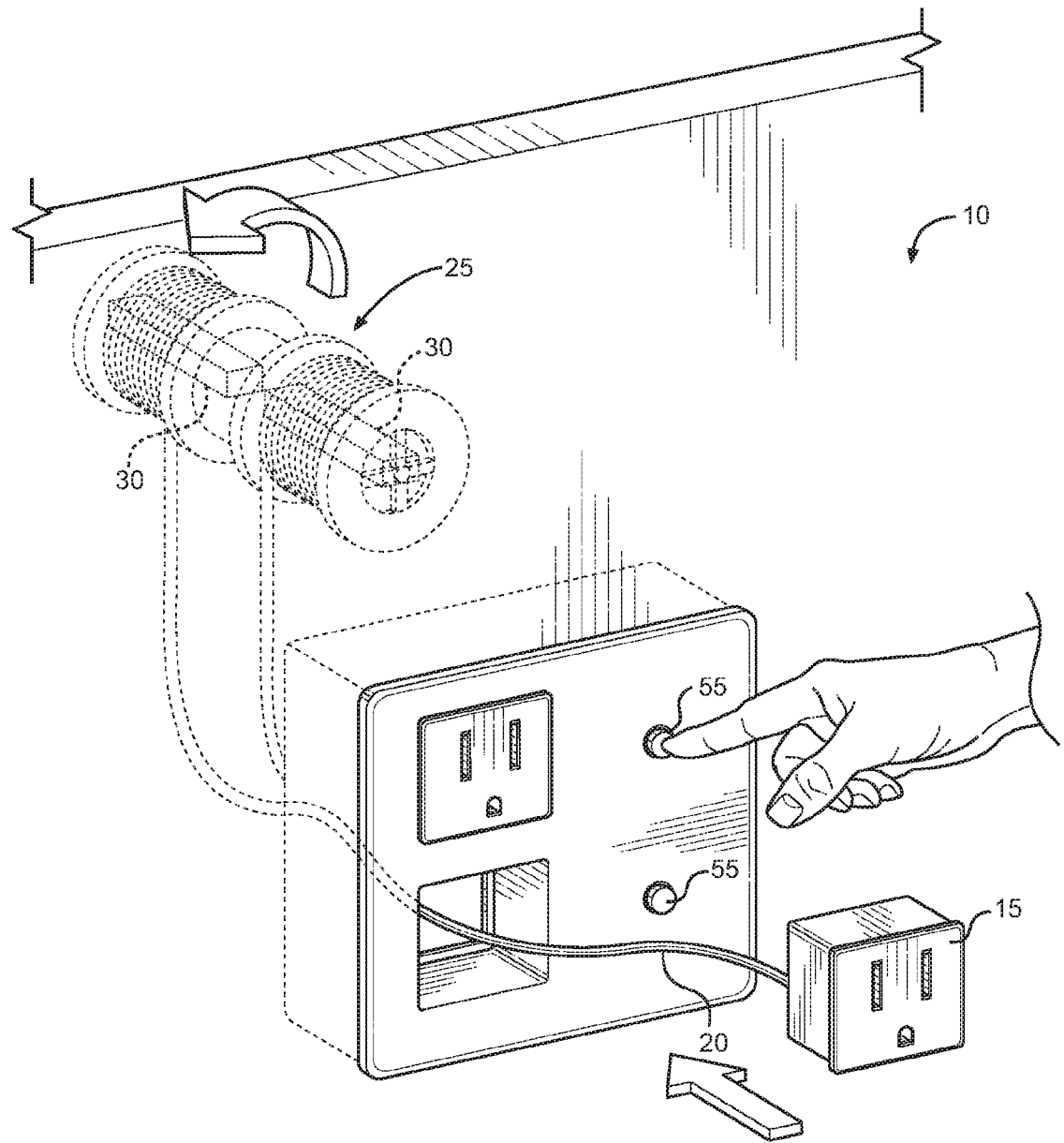
FIG. 3 shows a partial phantom view of an electrical cable being wound and retracted into the wall outlet.

Referring now to FIG. 3, there is shown a partial phantom view of an electrical cable being wound and retracted into the wall outlet. The wall outlet 10 further comprises one or more actuators 30 configured to retract and wind the electrical cables 20, which have been extended from the wall outlet 10, back around the spool 25. Each actuator 30 is coupled to an independently rotatable section of the spool 25. Actuation of the actuator 30 triggers the actuator 30 to rotate the corresponding section of the spool 25 in a second direction, which thereby winds the electrical cable 20 of that section back around the spool 25. In one embodiment, the actuation of the actuator 30 triggers the actuator 30 to rotate the corresponding section of the spool 25 counterclockwise, thereby winding the electrical cable 20 of that section back around the spool 25. In another embodiment, actuation of the actuator 30 triggers the actuator 30 to rotate the corresponding section of the spool 25 clockwise, thereby winding the electrical cable 20 of that section back around the spool 25. In one embodiment, the actuator 30 is an electric motor. In another embodiment, the actuator 30 is a retractor rewind assembly, comprising a spring loaded cable configured to retract the electrical cable 20 around the spool upon actuation of the spring.

The wall outlet 10 further comprises one or more activation switches 55 configured to trigger the actuators 30. Each activation switch 55 is coupled to an actuator 30. Actuation of an activation switch 55 triggers the corresponding actuator 30 to rotate the rotatable section 50 corresponding to that actuator 30, thereby winding and retracting the cable 20 and electrical receptacle 15 corresponding to that section 50. In the depicted embodiment, the activation switches 55 comprise depressible buttons, wherein depression of a button triggers the corresponding actuator 30 to retract an electrical cable 20 of a section 50 corresponding to that actuator 30.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wall outlet, comprising:
   a wall outlet box including a side plate directly affixed to a face plate, the side plate extending perpendicularly outwardly from a perimeter edge of the face plate, the side plate configured to be mounted into a wall outlet cavity of a structure;

the face plate comprising an aperture, the aperture including an interior volume configured to removably receive an electrical receptacle therein and an interior wall having a lip disposed around a perimeter edge of the interior wall, the lip extending horizontally inwards towards the interior volume of the aperture;

an electrical cable including a first end in electrical communication with an electrical power source of a structure and a second end in electrical communication with the electrical receptacle;

a spool mounted into an interior of a wall cavity of a structure, the spool mounted perpendicularly onto a wall adjacent to the wall outlet cavity of the structure;

wherein the spool includes a rotable section rotatably coupled to the electrical cable;

wherein the wall cavity is between the wall outlet cavity and a stud of the structure;

an actuator coupled to the rotatable section of the spool, the actuator configured to rotate the rotatable section of the spool;

wherein rotation of the rotatable section in a first direction causes the electrical cable to wind therearound and the electrical receptacle to retract;

wherein rotation of the rotatable section in a second direction causes the electrical cable to unwind therearound and the electrical receptacle to extend.

2. The wall outlet of claim 1, wherein the face plate comprises two apertures disposed on the same longitudinal axis.

3. The wall outlet of claim 1, wherein the actuator comprises an electric motor.

4. The wall outlet of claim 1, wherein the actuator comprises a retractor rewind assembly including a spring.

5. The wall outlet of claim 1, further comprising an activation switch coupled to the actuator, wherein actuation of the activation switch triggers the actuator to rotate the rotatable section of the spool in the second direction.

6. The wall outlet of claim 5, wherein the activation switch comprise a depressible button.

* * * * *